US008000072B2

(12) United States Patent
Bauer et al.

(10) Patent No.: US 8,000,072 B2
(45) Date of Patent: Aug. 16, 2011

(54) APPARATUS FOR SHORT CIRCUIT PROTECTION

(75) Inventors: Bernhard Bauer, Pentling (DE); Ola Dovnäs, Mariefred (SE); Mauricio Hernandez-Distancia, Neutrabling (DE); Milan Krstev, Regensburg (DE)

(73) Assignees: Siemens VDO Automotive AG, Regensburg (DE); Scania CV AB, Soedertaelje (SE)

( * ) Notice: Subject to any disclaimer, the term of this patent is extended or adjusted under 35 U.S.C. 154(b) by 639 days.

(21) Appl. No.: 11/914,760

(22) PCT Filed: May 5, 2006

(86) PCT No.: PCT/EP2006/062098
§ 371 (c)(1),
(2), (4) Date: Sep. 15, 2008

(87) PCT Pub. No.: WO2006/122884
PCT Pub. Date: Nov. 23, 2006

(65) Prior Publication Data
US 2009/0303647 A1 Dec. 10, 2009

(30) Foreign Application Priority Data
May 17, 2005 (EP) .................................... 05010682

(51) Int. Cl.
*H02H 3/08* (2006.01)
*H02H 9/02* (2006.01)
(52) U.S. Cl. .............................. 361/87; 361/79; 361/93.1
(58) Field of Classification Search .................... 361/87, 361/79, 77, 93.1
See application file for complete search history.

(56) References Cited

U.S. PATENT DOCUMENTS

| 3,417,293 | A | * | 12/1968 | Peaslee et al. ................ 361/84 |
| 4,275,313 | A | * | 6/1981 | Boll et al. ..................... 326/87 |
| 5,600,233 | A | * | 2/1997 | Warren et al. ................. 323/237 |
| 6,269,011 | B1 | * | 7/2001 | Ohshima ........................ 363/50 |
| 6,803,743 | B2 | * | 10/2004 | George et al. ................ 320/105 |
| 6,912,110 | B2 | * | 6/2005 | Schneider et al. ............ 361/104 |
| 2003/0076644 | A1 | | 4/2003 | Schneider et al. |
| 2003/0080621 | A1 | | 5/2003 | Kirk |
| 2005/0035656 | A1 | * | 2/2005 | Kuramochi et al. ......... 307/10.1 |

FOREIGN PATENT DOCUMENTS

| DE | 41 42 760 C1 | 4/1993 |
| EP | 1 028 511 A2 | 8/2000 |
| EP | 1 478 072 A2 | 11/2004 |

* cited by examiner

*Primary Examiner* — Jared J Fureman
*Assistant Examiner* — Zeev Kitov
(74) *Attorney, Agent, or Firm* — Laurence A. Greenberg; Werner H. Stemer; Ralph E. Locher

(57) ABSTRACT

The present invention relates to an apparatus for short circuit protection. The apparatus comprises two supply inputs for connecting the apparatus to a terminal of a power supply and two supply paths being connected together and to the supply inputs, wherein each supply path comprises a disconnection means for disconnecting the supply path. Further the apparatus comprises a determination means for determining a current flowing from one of the supply paths through the other one of the supply paths and a control means for controlling the disconnection means of the supply paths dependent on the current determined by the determination means, wherein the control means is connected with the disconnection means and the determination means.

22 Claims, 3 Drawing Sheets

APPARATUS FOR SHORT CIRCUIT PROTECTION

BACKGROUND OF THE INVENTION

Field of the Invention

The invention relates in general to an apparatus for short circuit protection. Particularly, the present invention relates to a control circuit of an engine for a motor vehicle.

Usually, such an apparatus is connected with a power supply, e.g. a battery of a motor vehicle. For protecting the apparatus in case of a short circuit the connection between the power supply and the apparatus comprises a fuse. Additionally, such an apparatus might be used for a reverse-connect protection in case that the power supply is wrongly reverse-connected with the apparatus. For such a reverse-connect protection the use of an active protection circuit comprising a Field Effect Transistor, FET, particularly a MOS-FET, is feasible. This limits the dissipation power appearing at a high current consumption of the apparatus.

At a short circuit of a line protected by a fuse, the I2t value, i.e. the product of time and squared current until the fuse is triggered, increases with increasing rated current of the fuse. The higher the rated current of the fuse, the more energy is consumed until the fuse is triggered or blown, thus increasing the risk of a fire, for example. Also, the higher the current consumption of an apparatus, the higher is the required wire size. Wire cross-sections of >2.5 mm$^2$ are complexer in its processing and require plugs designed correspondingly with regard to the mechanics and the current carrying capacity. To avoid these two disadvantages it is possible to connect two lines in parallel. Each of these two lines being protected by a respective fuse. Therefore, the fuse can be designed with a lower rated current and the wires can be designed with a lower cross-section as compared with a single line.

BRIEF SUMMARY OF THE INVENTION

Therefore, it is an object of the present invention to provide an apparatus for short circuit protection which limits the risk of a damage in case of a short circuit to ground at one of the supply inputs of the apparatus.

This object is solved by an apparatus for short circuit protection having the features of claim 1.

The present invention provides an apparatus for short circuit protection comprising two supply inputs for connecting the apparatus to a terminal of a power supply, two supply paths being connected together and to the supply inputs, wherein each supply path comprises a disconnection means for disconnecting the supply path, a determination means for determining a current flowing from one of the supply paths through the other one of the supply paths and a control means for controlling the disconnection means of the supply paths dependent on the current determined by the determination means, wherein the control means is connected with the disconnection means and the determination means.

According to the present invention the apparatus comprises two supply paths which run in parallel within the apparatus. At one of their ends the supply paths are connected together, thereby forming a joint, a common connection point. At the respective other one of their ends the supply paths are connected with different ones of the supply inputs. If the apparatus is connected with a power supply and if there is a short circuit at one of the supply inputs a current flows from the supply input which has no short circuit to the joint, from there through the supply path which is connected with the supply input having the short circuit and then to the supply input with the short circuit. The current through the supply path which is connected with the supply input with the short circuit flows in a direction which is reverse the direction of the current flow during normal operation without the short circuit. The current flowing from the joint through the supply path which is connected with the supply input having the short circuit is determined. This determined current is used then for controlling the disconnection means which are incorporated within the supply paths for connecting and disconnecting the supply paths.

Particularly, the controlling of the disconnection means can be dependent on a predetermined condition which the determined current has to fulfil. According to the present invention if the respective disconnection means disconnects the assigned supply path the coupling between the two supply paths is cut in case of a short circuit. Advantageously, the supply paths are protected. Also, the reduction of an I2t value of a fuse which might be used to protect the apparatus is possible here since only one of the fuses is triggered in case of a short circuit to ground of one of the supply paths.

The apparatus comprises a detection means for detecting whether or not the supply inputs are connected with the terminal of the power supply, wherein the detection means is connected with a evaluation circuit. The evaluation circuit enables to detect whether or not the apparatus is supplied with power. Advantageously, the evaluation circuit comprises a micro-controller.

Further advantageously, with the apparatus according to the present invention it is possible to check whether or not the current split up between the two parallel supply paths is symmetrical. Particularly, ageing and/or damage of external and/or internal components can lead to an unbalanced split up of the current flowing into supply paths of the apparatus. Advantageously, the determining means and the current determined by them additionally can be used for checking the symmetrical current split up. For this, the output of the determining means might be connected with a certain evaluation unit which interprets the determined currents, correspondingly.

In a preferred embodiment the disconnection means comprises a controllable switch or resistor, particularly a Field Effect Transistor, FET. This guarantees a very fast disconnection of the supply path and a low dissipation power.

In a further preferred embodiment the control means comprises a compare means for comparing the determined current and a predetermined threshold. This control means is designed to control the disconnection means dependent on the result of the comparison. E.g., if the determined current reaches the predetermined threshold the control means drives the disconnection means to disconnect the supply path. Through the definition of the threshold it is possible to determine a short circuit correctly.

Advantageously, the control means comprises a controllable switch, particularly a transistor, which is connected with the compare means and the disconnection means. This is a very easy and effective way to drive the disconnection means.

In a preferred embodiment the determination means is designed such that it determines a voltage drop across a component of the supply paths. In this case the current flowing through the supply path is determined indirectly. This is a very easy and exact way to determine the reverse current.

The determination means can be designed such that it determines the voltage drop across the disconnection means. Particularly, if the disconnection means comprises a FET and is designed such that it determines the voltage drop across drain-to-source of the FET the apparatus of the present invention comprises an effective protection against the short circuit without using a great complexity. In case of the short circuit the reverse flowing current results in a positive drain-to-source voltage which then can be determined and used for controlling the disconnection of the supply path. Advantageously, the disconnecting means stays in the disconnecting state as long as the short circuit exists.

In a further preferred embodiment at least one of the supply paths comprises a shunt which is connected in series to the respective disconnection means of the at least one of the supply paths and the determination means is designed such that it determines a voltage drop across the shunt. This is advantageous since the determination means is not directly determining the current at the disconnection means.

Advantageously, the control means which is connected with the disconnection means of the at least one of the supply paths comprises an auto-restart circuit for generating a predetermined delay time for connecting the at least one of the supply paths again, after it has been disconnected by means of the disconnection means. This ensures that the disconnection means does not automatically connect the supply path again, when the voltage drop across the shunt decreases and particularly falls under a predetermined value due to the disconnection of the supply path.

Particularly, the disconnection means is designed such that it protects the apparatus against a reverse-connection of the power supply. Therefore, the apparatus of the present invention enables a further protection, namely the protection against reverse-connection which might destroy components of the apparatus.

In a preferred embodiment at least one of the supply paths comprises a further disconnection means for a reverse-connect protection, wherein this further disconnection means is connected in series to the disconnection means of the at least one of the supply paths. In this case the further disconnection means used for the reverse-connect protection and the disconnection means used for protection in case of the short circuit are separated from each other. Advantageously, it is possible to determine the current in a simple way at the disconnection means and further to protect the determining means in case of a reverse-connection.

Advantageously, the further disconnection means comprises a further FET. This FET might be used as controllable switch which very simply ensures the disconnection in case of the reverse-connection.

In a further preferred embodiment the determination means comprises a differential amplifier. With such an amplifier it is possible to determine the current exact and without complex circuitry. It is a cost-efficient solution.

In a further preferred embodiment each of the supply inputs is connected with a respective detection means. This ensures an even better and more exact detection of whether or not the apparatus is correctly supplied with power.

Advantageously, the respective detection means comprises a voltage divider. This is a particular simple and cost-efficient design of the detection means.

In a preferred embodiment the power supply inputs are connected with the terminal of the power supply via fuses. This ensures a basic protection of the apparatus against the short circuit.

In a preferred embodiment the apparatus comprises more than two supply inputs for connecting the apparatus to the terminal of the power supply and more than two supply paths being connected together and to the supply inputs, wherein each supply path comprises the disconnection means for disconnecting the assigned supply path. With this design it is possible to further split up the current through the apparatus to more than two supply paths. This further reduces design requirements of wires and fuses, for example.

In a preferred embodiment the apparatus is a control circuit for controlling an engine of a motor vehicle. Particularly, the power supply is a battery of a motor vehicle and the terminal of the power supply with which the supply inputs are connected is a positive terminal of the battery.

BRIEF DESCRIPTION OF THE SEVERAL VIEWS OF THE DRAWING

Exemplifying embodiments of the present invention will be described below with reference to the accompanying drawings, in which.

DESCRIPTION OF THE INVENTION

Figure 1:
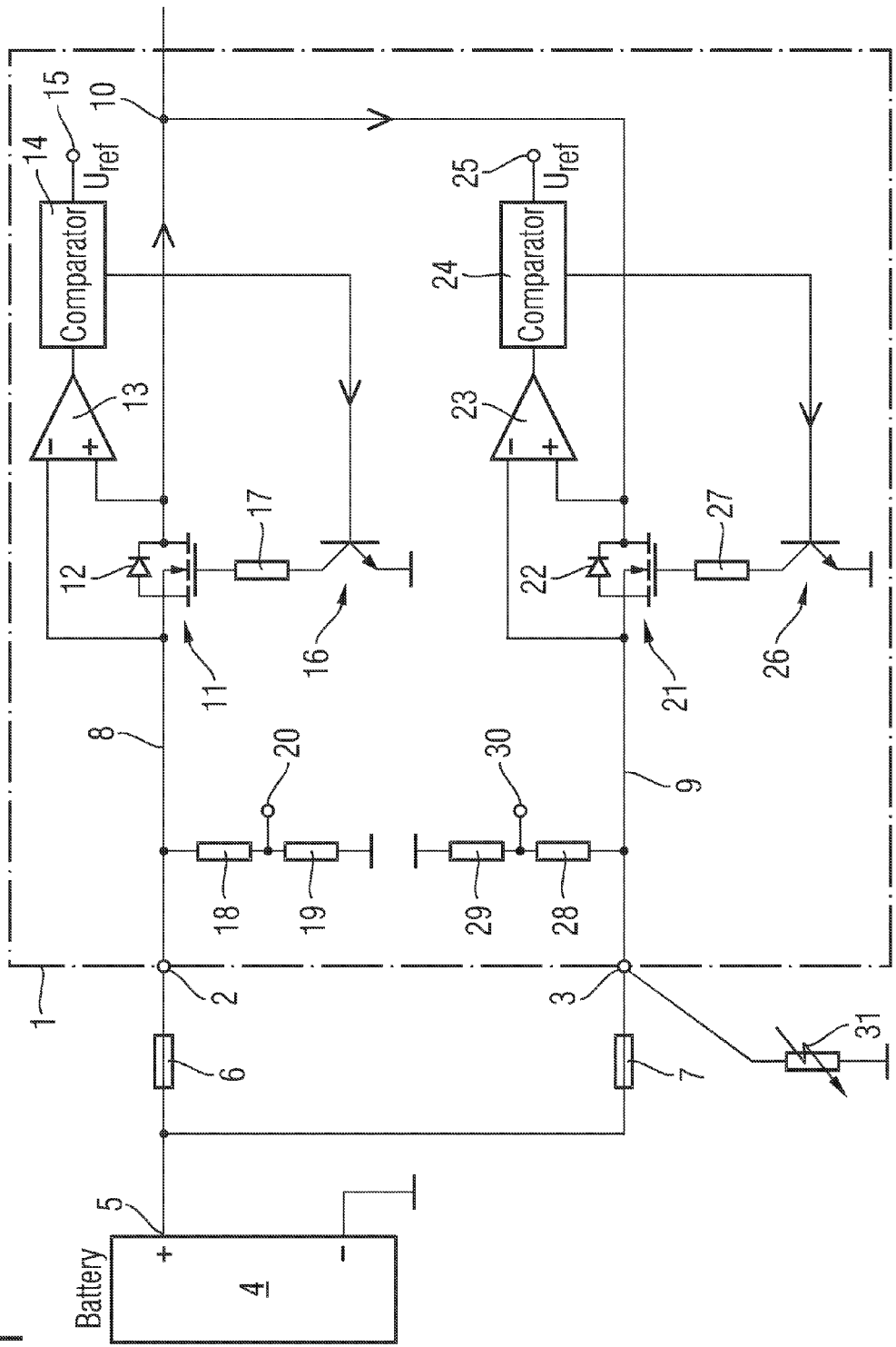
FIG. 1 shows a first embodiment of an apparatus for short circuit protection of the present invention.

In the drawings identical and/or similar features are—as far as nothing else is set forth—indicated with the same reference numbers.

FIG. 1 shows a first embodiment of an apparatus for short circuit protection. Here the apparatus is a control circuit 1 for controlling an engine of a motor vehicle, particularly an automobile. The control circuit 1 comprises two supply inputs 2 and 3 which are connected with a power supply. Here the power supply is a battery 4 of the motor vehicle. Both supply inputs 2 and 3 are connected with the same terminal of the battery 4, here they are connected with a positive terminal 5. To protect the wires between the battery 4 and the control circuit 1 fuses 6 and 7 are inserted into the connections of the supply inputs 2, 3 with the battery 4.

The control circuit 1 further comprises a first supply path 8 which is connected at its first end with the supply input 2 and a second supply path 9 which is connected at its first end with the supply input 3. The supply paths 8, 9 are at their respective second ends connected together, thereby building a joint 10 which represents a common connection point of the two supply paths 8, 9.

The first supply path 8 comprises a first Field Effect Transistor 11, FET, which is a n-channel MOS-FET, here. The FET 11 can be interpreted as a controllable switch or resistor which is used as disconnection means for disconnecting the supply path 8. The source of the FET 11 is connected with the supply input 2 and the drain of the FET 11 with the joint 10. The FET 11 typically comprises an integrated body diode 12 which works in parallel to the source-to-drain connection of the FET 11. The anode of the body diode 12 is connected with the source of the FET 11 and the cathode of the body diode 12 is connected with the drain of the FET 11. The FET 11 is designed such that it protects the control circuit 1 against a reverse-connection of the battery 4. If the battery 4 is connected with the control circuit 1 in the correct polarity the control circuit 1 first is supplied by the body diode 12 of the FET 11.

Then, with a certain delay a positive auxiliary voltage is built-up across gate-to-source of the FET 11 which switches on the FET 11. If the battery 4 is connected with the control circuit 1 in the wrong polarity, i.e. the control circuit 1 is reverse-connected, the FET 11 always works as diode since there is no auxiliary voltage built up across gate-to-source of the FET 11. The body diode 12 is reverse-biased. The FET 11 blocks and protects the control circuit 1 and its components against negative voltages and thus against destruction. Of course, it is also possible to design the control circuit 1 with a p-channel FET instead of the n-channel FET.

In parallel to the FET 11 a differential amplifier 13 is connected. The inverting input of the amplifier 13 is connected with the source and the non-inverting input of the amplifier 13 is connected with the drain of the FET 11. Therefore, the differential amplifier 13 determines the voltage drop across drain-to-source of the FET 11. The differential amplifier 13 is designed as determination means for determining the current flowing through the supply path 8, particularly the current flowing in the reverse direction, i.e. from the supply path 9 to the joint 10 and from there into and through the supply path 8. The current is determined indirectly by using the voltage drop across a component of the supply path 8, here drain-to-source resistance of the FET 11.

The output of the differential amplifier 13 is connected with a comparator 14. Also, a reference voltage Uref is applied to an input 15 of the comparator 14 which is designed here as a compare means. The reference voltage Uref represents a certain predetermined threshold value for the current flowing through the supply path 8. The comparator 14 compares the output of the differential amplifier 13 and the reference voltage Uref and outputs a signal corresponding to the result of this comparison. The output of the comparator 14 is coupled with the basis of a transistor 16. The emitter of the transistor 16 is connected with ground and the collector of the transistor 16 via a resistor 17 with the gate of the FET 11. The transistor 16 is designed to be a controllable switch which switches on and off the FET 11 in dependence on the output signal of the comparator 14. The comparator 14, the transistor 16 and the resistor 17 are designed to be a control means for controlling the disconnection means, i.e. the FET 11, of the supply path 8 dependent on the current determined by the determination means, i.e. the differential amplifier 13.

The supply input 2 additionally is connected with a voltage divider comprising a resistor 18 and a resistor 19 which are connected in series. At its other end the voltage divider is connected to ground. An output 20 which lies between the two resistors 18, 19 of the voltage divider is connected with an input, particularly an analogue input, of a μ-controller. This μ-controller is designed such that it is used to determine whether or not there is a supply voltage applied to the supply input 2. Particularly, it is possible to determine whether or not the fuse 6 is triggered. The μ-controller is part of an evaluation circuit.

The second supply path 9 is designed in the same way as the first supply path 8. Correspondingly, the second supply path 9 comprises a second FET 21 whose source is connected with the supply input 3 and whose drain is connected with the joint 10. The FET 21 comprises a body diode 22. In parallel to the FET 21 there is connected a differential amplifier 23. The output of the differential amplifier 23 is connected with a comparator 24 which has an input 25 to which the reference voltage Uref is applied, too. The output of the comparator 24 is coupled with the basis of a transistor 26 whose emitter is connected to ground and whose collector is connected via a resistor 27 to the gate of the FET 21. The supply input 3 is connected with a voltage divider comprising resistors 28 and 29 which are connected in series.

An output 30 which lies between the two resistors 28, 29 of the voltage divider is connected with a further input, particularly an analogue input, of the μ-controller. The μ-controller is designed such that it is used to determine whether or not there is a supply voltage applied to the supply input 3. Particularly, it is possible to determine whether or not the fuse 7 is triggered.

With the control circuit 1 according to the present invention it is possible to protect components, particularly the fuses 6, 7, in case of a short circuit at one of the supply inputs 2, 3. FIG. 1 shows a short circuit 31 to ground at the supply input 3. A short circuit at the supply input 2 would be handled correspondingly. The control circuit 1 comprises two parallel supply paths 8, 9 which are both connected to the positive terminal 5 of the battery 4. This is designed to distribute the current to the two supply paths to limit the requirements for the wires, particularly their cross-sections. Therefore, without further protection both fuses 6, 7 would be triggered or blown in case of the short circuit 31, i.e. without the protection provided by the differential amplifiers 13, 23, the comparators 14, 24 and the transistors 16, 26, etc, controlling the FETS 11, 21. In such a case without the further protection a very high current could flow directly to the supply input 3 and the short circuit 31 to ground. Further a very high current could flow to the supply input 2, through the supply path 8 to the joint 10 and from there as a reverse current through the supply path 9 and the short circuit 31 to ground. In this case both fuses 6, 7 would be triggered and blown to prevent the high current from flowing in the control circuit 1.

According to the first embodiment of the present invention a positive drain-to-source voltage across the FET 11 or 21 can be determined. If the determined drain-to-source voltage exceeds a predetermined value given by the reference voltage Uref the respective FET 11 or 21 assigned to the supply path 8 or 9 whose supply input 2 or 3 is short-circuited, is driven to be switched off and disconnect the assigned supply path 8 or 9. In case of the short circuit 31 existing at the supply input 3 the fuse 7 is triggered and destroyed. Anyway, it is possible to protect the fuse 6 since the FET 21 disconnects the supply path 9.

As long as the short circuit exists the FET 11 or 21 stays switched off and the assigned supply path 8 or 9 stays disconnected. Advantageously, the FET 11 or 21 stays switched off even if the short circuit is removed, but the fuse is still blown. The source of the respective FET 11 or 21 is tied to ground via the voltage divider, whereas the positive potential of the battery 4 is applied to the drain. This particularly might provide an advantage if the existence of the battery voltage at the supply inputs 2, 3 is monitored to detect the blown fuse. As described above, the voltage dividers comprising the resistors 18, 19 and 28, 29 can be used for the detection. If the fuse 6 or 7 is still blown there is no voltage drop across the assigned voltage divider generated from the outside of the control circuit 1, i.e. from a voltage supplied by the battery 4. If the FET 11 or 21 of the assigned supply path 8 or 9 stays permanently switched off after the short circuit there is no voltage drop generated from the inside of the control circuit 1 across the respective voltage divider. Therefore, it is possible to detect a blown fuse.

Figure 2:
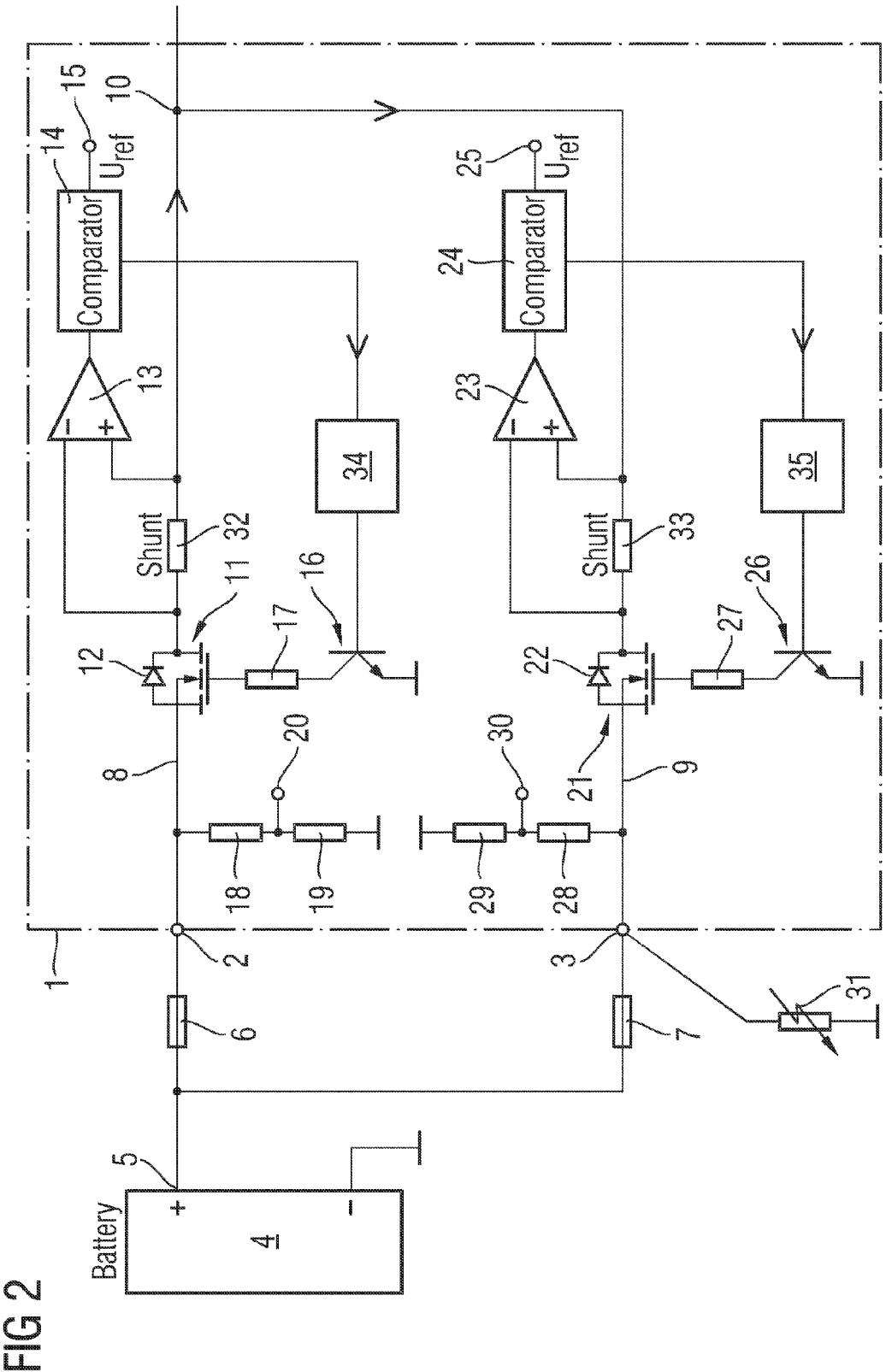
FIG. 2 shows a second embodiment of the apparatus for short circuit protection of the present invention.

FIG. 2 shows a second embodiment of the apparatus for short circuit protection of the present invention. Basically, the control circuit 1 according to the second embodiment corresponds to the control circuit 1 of the first embodiment of FIG. 1. In difference, the control circuit 1 of FIG. 2 comprises a first shunt 32 in the first supply path 8 and a second shunt 33 in the second supply path 9. The shunt 32 is connected in series to the FET 11 so that the shunt 32 is arranged between the drain of the FET 11 and the joint 10. In the second embodiment the differential amplifier 13 for determining a voltage drop across a component of the supply path 8 is no longer connected in parallel to the FET 11, but rather in parallel to the shunt 32. Therefore, the differential amplifier 13 determines the voltage drop across the shunt 32.

Also, in the second embodiment the differential amplifier 23 for determining a voltage drop across a component of the supply path 9 is no longer connected in parallel to the FET 21, but rather in parallel to the shunt 33. Therefore, the differential amplifier 23 determines the voltage drop across the shunt 33. The FETs 11 and 21 are still designed to disconnect the supply paths 8, 9 in case the voltage drops across the shunts 32, 33 are higher than the reference voltage Uref applied to the comparators 14, 24.

The control circuit 1 according to the second embodiment has the advantage that the differential amplifiers 13, 23 are no longer directly connected with the positive terminal 5 of the battery 4. Since the FETs 11 and 21 are arranged between the battery 4 and the differential amplifiers 13, 23 and since they are still used to protect the control circuit 1 against a reverse-connection of the battery 4 it is not possible that an improper negative voltage is applied to the inputs of the differential amplifiers 13, 23 in case of a reverse-connection of the battery 4.

Further, to avoid a direct switching on of the FETs 11, 21 when the voltage drop across the respective shunts 32, 33 decreases again after disconnecting the respective supply path 8, 9 an auto-restart circuit 34 is arranged between the output of the comparator 14 and the transistor 16 and an auto-restart circuit 35 is arranged between the output of the comparator 24 and the transistor 26. The auto-restart circuits 34, 35 are designed for generating a predetermined delay time for connecting the supply paths 8, 9 again after they have been disconnected by means of the FETS 11, 21. A continuous high frequency switching on and off of the FETs 11, 21 is advantageously prevented. The auto-restart circuits 34, 35 provide a fast switching off of the FETs 11, 21 and therefore, a fast disconnection of the supply paths 8, 9 in case of a short circuit, and also a sufficient delay time before switching on the FETs 11, 21, again. A triggered or blown fuse can be detected if the FETs 11, 21 are switched off for diagnostic purpose.

Figure 3:
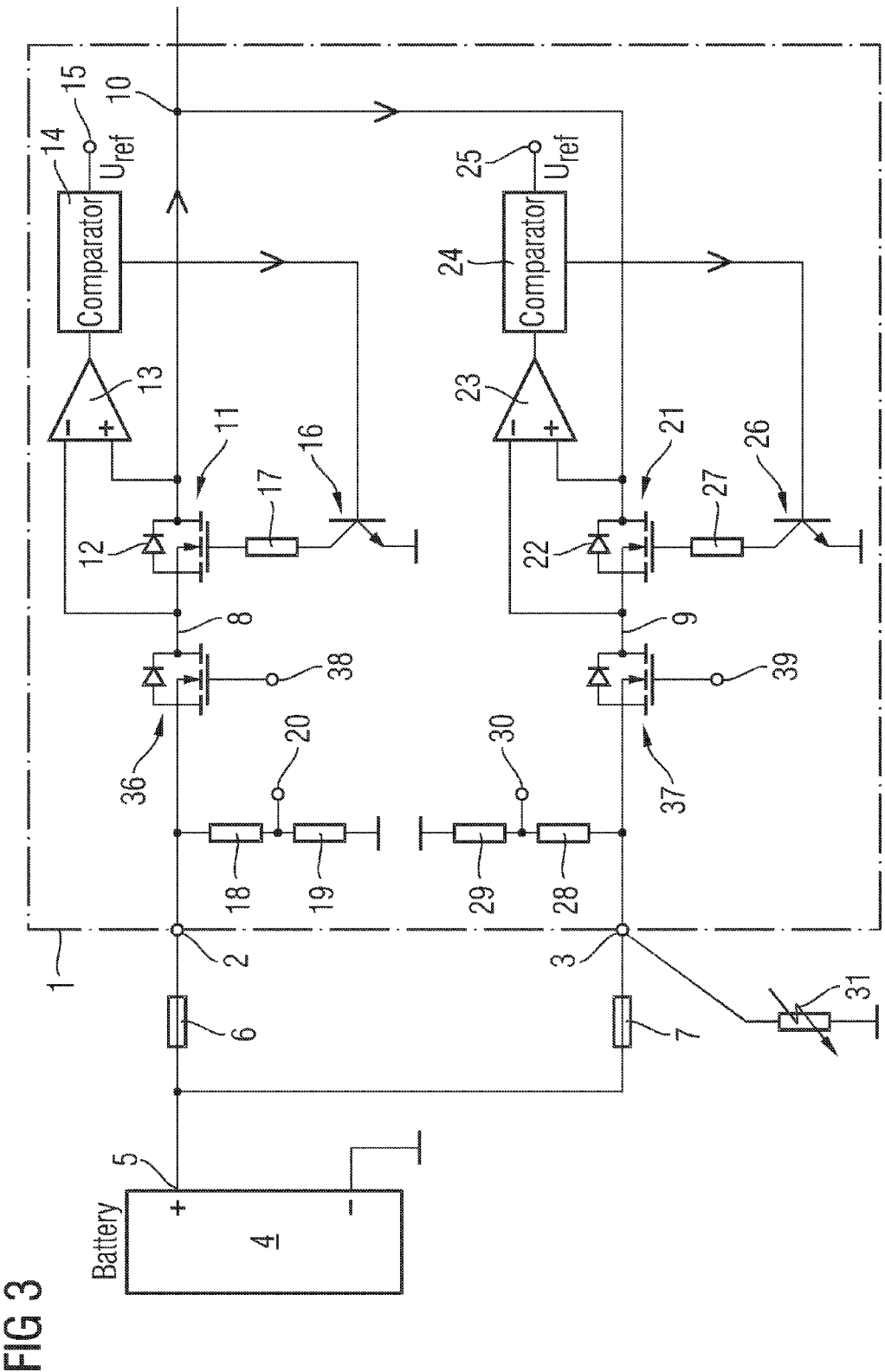
FIG. 3 shows a third embodiment of the apparatus for short circuit protection of the present invention.

FIG. 3 shows a third embodiment of the apparatus for short circuit protection of the present invention. Basically, the control circuit 1 according to the third embodiment corresponds to the control circuit 1 of the first embodiment of FIG. 1. In difference, the control circuit 1 of FIG. 3 comprises a third FET 36 which is arranged in the first supply path 8 and which is connected in series with the FET 11, whereas the source of the FET 36 is connected with the supply input 2 and the drain of the FET 36 with the source of the FET 11.

Also, the control circuit 1 of FIG. 3 comprises a fourth FET 37 which is arranged in the second supply path 9 and which is connected in series with the FET 21, whereas the source of the FET 37 is connected with the supply input 3 and the drain of the FET 37 with the source of the FET 21. In contrary to the first embodiment of FIG. 1, the FETs 11, 21 no longer fulfil the task to protect the control circuit 1 against a reverse-connection of the battery 4. Now, this task is fulfilled by the FETs 36, 37. The two tasks protection against reverse-connection on one side and protection against the short circuit on the other side are realised by separate means, now. To gates 38 and 39 of the FETs 36, 37 auxiliary control voltages are applied which switch on the FETs 36, 37. These auxiliary control voltages are set up via the body diodes of the FETs 36, 37 if the polarity of the connections with the battery are correct.

The control circuit 1 according to the third embodiment of FIG. 3 has the advantage that the inputs of the differential amplifiers 13, 23 are protected against critical negative, particularly transient, voltages. In case of a blown fuse the FETs 36, 37 are not switched on again. Additional auto-restart circuits like the auto-restart circuits 34, 35 are not necessary. A blown fuse can be detected at any time no matter what was the reason for the blowing as already described in connection with the first embodiment of FIG. 1.

The symmetrical split up of the current between the parallel supply paths 8, 9 is dependent on the internal components and circuitry of the control circuit 1 as well as the external connection elements, e.g. fuses, terminals, wires, between the battery 4 and the control circuit 1. The lower the resistance of the internal circuitry the higher is the influence of the external elements. An unbalanced split up of the current caused by ageing or damage of external elements or connections can be detected if the current in the respective supply paths is measured. Here, the differential amplifiers 13, 23 can be used additionally to determine or measure this current. For example, the outputs of the differential amplifiers 13, 23 are connected with further inputs of the μ-controller by the use of filters between the outputs of the differential amplifiers 13, 23 and the inputs of the μ-controller.

Above, a preferred embodiment of the present invention has been described. This should be seen as merely a non-limiting example. Many modifications will be possible within the scope of the invention as defined in the claims and the description without deviating from the core of the present invention. Particularly, it is possible to provide more than two parallel supply paths within the control circuit 1 and to distribute the current to these more than two supply paths. Advantageously, this further reduces design requirements of wires and fuses.

The invention claimed is:

1. An apparatus for short circuit protection, comprising:
a terminal of a power supply;
two supply inputs connected to the terminal of the power supply;
two supply paths connected to one another and to said supply inputs, wherein each said supply path comprises a disconnection means for disconnecting said supply path;
determination means for determining a current flowing from one of said supply paths through the other one of said supply paths;
control means connected to said disconnection means and to said determination means, said control means controlling said disconnection means of said supply paths in dependence on a current determined by said determination means; and
detection means for detecting whether or not said supply inputs are connected to the terminal of the power supply.

2. The apparatus according to claim 1, wherein said disconnection means comprises a controllable switch or resistor.

3. The apparatus according to claim 2, wherein said controllable switch is a field effect transistor.

4. The apparatus according to claim 1, wherein said control means comprises a comparator for comparing a determined current and a predetermined threshold, and said control means is configured to control said disconnection means in dependence on an output of said comparator.

5. The apparatus according to claim 4, wherein said control means comprises a controllable switch connected to said comparator and said disconnection means.

6. The apparatus according to claim 5, wherein said controllable switch is a transistor.

7. The apparatus according to claim 1, wherein said determination means is configured to determine a voltage drop across a component of said supply paths.

8. The apparatus according to claim 7, wherein said determination means is configured to determine the voltage drop across said disconnection means.

9. The apparatus according to claim 8, wherein said disconnection means comprises a field effect transistor and said determination means is configured to determine a drain-to-source voltage drop across the field effect transistor.

10. The apparatus according to claim 1, wherein at least one of said supply paths includes a shunt connected in series with the respective said disconnection means of said at least one supply path, and said determination means is configured to determine a voltage drop across said shunt.

11. The apparatus according to claim 10, wherein said control means comprises an auto-restart circuit for generating a predetermined delay time for connecting said at least one of said supply paths after a disconnection thereof by way of said disconnection means.

12. The apparatus according to claim 1, wherein said disconnection means is configured to protect the apparatus against a reverse-connection of the power supply.

13. The apparatus according to claim 1, wherein at least one of said supply paths comprises a further disconnection means for reverse-connect protection, and wherein said further disconnection means is connected in series with said disconnection means of said at least one of said supply paths.

14. The apparatus according to claim 13, wherein said further disconnection means comprises a field effect transistor.

15. The apparatus according to claim 1, wherein the determination means comprises a differential amplifier.

16. The apparatus according to claim 1, wherein each of said supply inputs is connected with a respective said detection means.

17. The apparatus according to claim 1, wherein said detection means comprises a voltage divider.

18. The apparatus according to claim 1, which comprises fuses connected between said supply inputs and the terminal of the power supply.

19. The apparatus according to claim 1, which comprises more than two supply inputs for connecting the apparatus to the terminal of the power supply and more than two said supply paths connected together and to said supply inputs, wherein each said supply path includes a respective said disconnection means for disconnecting the respective said supply path.

20. The apparatus according to claim 1 configured as a control circuit for controlling an engine of a motor vehicle.

21. The apparatus according to claim 1, wherein the power supply is a battery of a motor vehicle.

22. The apparatus according to claim 21, wherein the terminal of the power supply with which said supply inputs are connected is a positive terminal of the battery.

* * * * *